United States Patent [19]

Beale

[11] 4,109,674
[45] Aug. 29, 1978

[54] PRESSURE AND VACUUM RELIEF VALVE ASSEMBLY

[75] Inventor: David A. Beale, Huron, Ohio

[73] Assignee: General Motors Corporation, Detroit, Mich.

[21] Appl. No.: 800,198

[22] Filed: May 25, 1977

[51] Int. Cl.² ............................................. F16K 17/26
[52] U.S. Cl. .................... 137/493.9; 220/203; 220/204
[58] Field of Search .............. 137/43, 493, 493.9; 220/203, 204, 209, DIG. 32, DIG. 33

[56] References Cited

U.S. PATENT DOCUMENTS

| 3,937,358 | 2/1976 | Smith | 220/203 |
| 3,983,894 | 10/1976 | Sheppard | 137/493 X |
| 4,033,475 | 7/1977 | Evans | 137/43 X |

Primary Examiner—Harold W. Weakley
Attorney, Agent, or Firm—R. L. Phillips

[57] ABSTRACT

In a pressure and vacuum relief valve assembly for a container that normally operates to limit pressure in the container both above and below atmospheric pressure, an auxiliary seal arrangement is provided that operates to prevent leakage from the container during and after an abnormal pressure surge.

2 Claims, 6 Drawing Figures

PRESSURE AND VACUUM RELIEF VALVE ASSEMBLY

This invention relates to a vacuum and pressure relief valve assembly for a container and more particularly to such an assembly wherein leakage from the container is prevented in the event of an abnormal pressure surge.

An object of the present invention is to provide a new and improved pressure and vacuum relief valve assembly for a container.

Another object is to provide a pressure and vacuum relief valve assembly for a container wherein an auxiliary sealing arrangement is provided that operates to prevent leakage from the container during and after abnormal pressure surge.

These and other objects of the invention will become more apparent from the following description and drawings in which.

Figure 1:
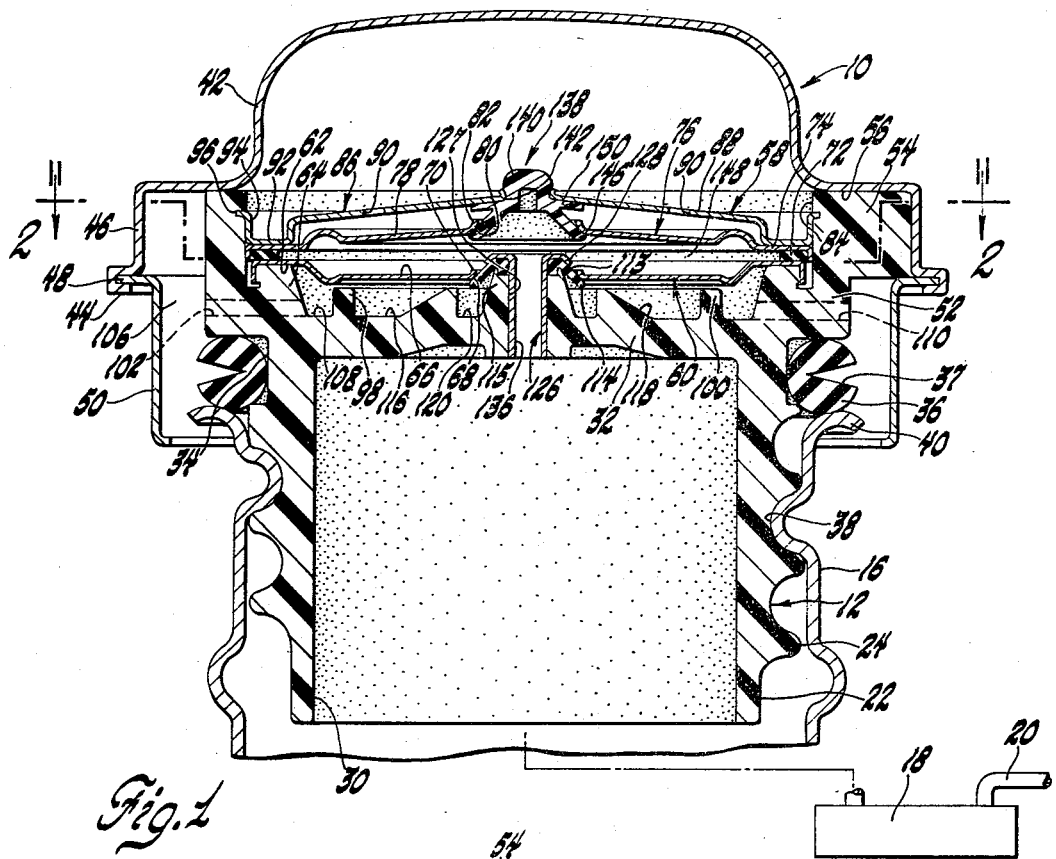
FIG. 1 is a view in vertical section of a pressure and vacuum relief valve assembly showing both of the diaphragms in their closed position.
Figure 2:
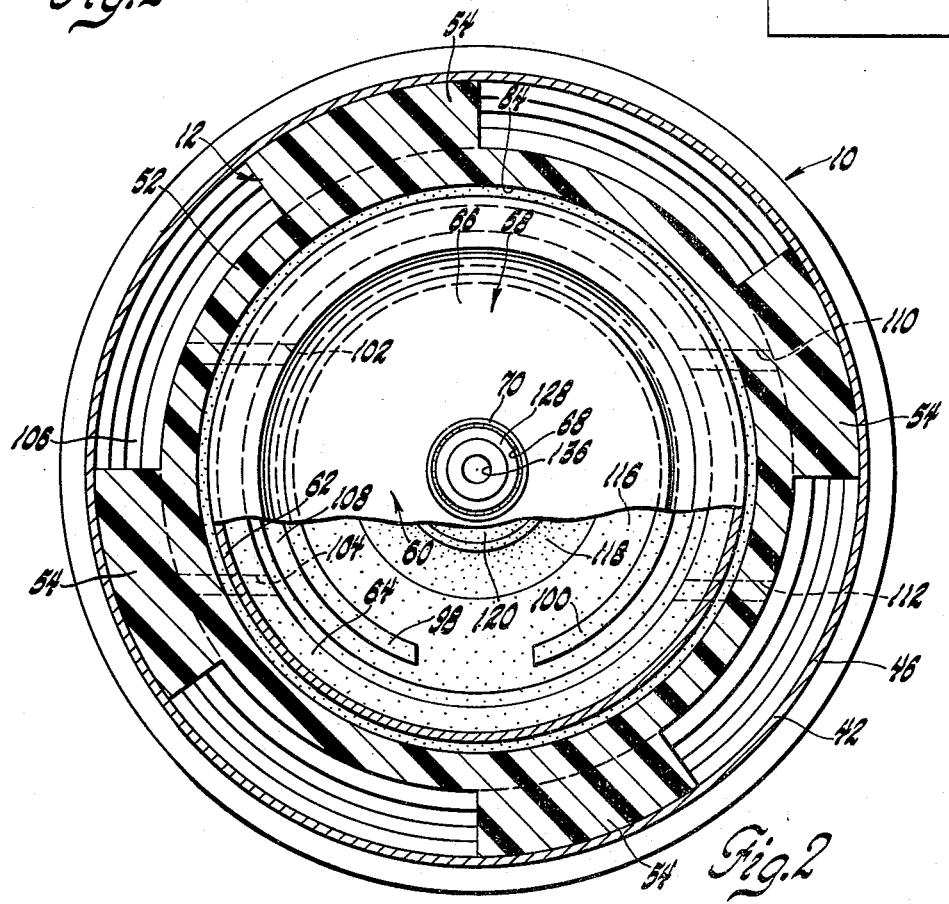
FIG. 2 is a view in horizontal section taken along the line 2—2 of FIG. 1 looking in the direction of the arrows.

Referring now to FIGS. 1 and 2 in the drawings, a fuel cap 10 is illustrated. It includes a plastic closure 12 preferably made of Delrin 500, an aceytal resin made by DuPont Company, or Valox 310, a polyester resin made by General Electric Company.

The closure 12 is associated with a fuel filler neck 16. The neck 16 defines a fuel opening into a fuel tank or container 18 of a semi-closed fuel supply system with known evaporative emission controls. A fuel suction pipe 20 communicates with container 18 to remove fuel therefrom.

The closure 12 includes a depending, tubular skirt portion 22 having a helical thread 24 formed on the outer periphery thereof. The thread 24 is formed to provide four threads per inch with three full turns of the thread being a minimum.

The skirt has a large diameter internal bore 30 directed therethrough opened at the bottom of the skirt 22 and closed at the top thereof by a wall portion thereon in the form of an upper partition wall 32 on the closure 12 formed transversely of the shell skirt.

The closure 12 includes a peripheral groove 34 therein radially outwardly of the partition wall 32. An O-ring seal 36 with an outwardly facing circumferential V-shaped notch or groove 37 is supportingly received within the groove 34.

As illustrated in FIG. 1, the closure 12 is threadably connected to an internal thread 38 in the filler neck 16. The thread is located below an outwardly flared upper edge 40 forming the open end of the neck 16. When the cap 10 is seated in a sealed relationship within the neck 16, the O-ring 36 is held in sealed engagement with the upper edge 40 to seal between the closure 12 and the neck 16.

In the illustrated arrangement, the cap 10 has a cover 42 with a radially inwardly turned edge 44 on an outer peripheral wall 46 that secures a radially outwardly directed flange 48 on the end of a depending skirt 50 to cover 42. Skirt 50 will enclose the upper end of the neck 16 when the cap assembly is in place thereon. An upper end flange 52 on closure 12 has radially outwardly directed tabs 54 at circumferentially spaced points thereon press fit between a shoulder 56 on wall 46 and flange 48 to fixedly secure cover 42 to closure 12.

The upper end flange 52 of the closure 12 cooperates with the cover 42 and the partition wall 32 to enclose an improved pressure and vacuum control valve assmebly 58 constructed in accordance with the present invention.

The cap 10 and assembly 58 are utilized to prevent the escape of vapors from the filler neck 16 and tank or container 18 under normal pressure conditions in a semiclosed evaporative emission control system of the type well known to those skilled in the art. In such systems, vent lines are provided from a fuel tank that might be blocked. In such cases, further withdrawal of fuel from the fuel tank can cause a vacuum condition to occur therein that might eventually produce collapse of the fuel tank. Likewise, blockage of the vent system and subsequent thermal expansion and evaporation of fuel in the system sealed at the filler neck by means of the O-ring 36 can lead to an over-pressure condition within the system. Furthermore, under certain abnormal conditions such as where the fuel container is inverted, there may occur a very high pressure surge forcing leakage through the vent system in a cap.

Accordingly, the control valve assembly 58 includes means to relieve both excessive pressure build-up and vacuum conditions within a container of a semi-closed liquid-vapor system and also to prevent leakage on high pressure surge and assure return to normal pressure control conditions. The illustrated filler neck 16 and attached tank 18 are merely representative of a container having a liquid which will evaporate to produce overpressurization and which when withdrawn will produce a vacuum within the container, and whose pressure can be controlled by the improved valve assembly 58.

The valve assembly 58 more particularly includes a first apertured, spring diaphragm 60, also called vacuum diaphragm, that includes an outer peripheral edge 62 thereon bent over an internal flange in the form of an annular ridge 64 formed integrally on the closure 12 radially inwardly of the end flange 52 thereon. The vacuum diaphragm 60 has a downwardly concave, dished center 66 with a center opening 68 therein formed by an upwardly curved edge 70 on the diaphragm.

The upper surface of the outer peripheral edge 62 is engaged by one face of an annular rubber gasket 72 having the other face thereof in sealed engagement with the underside of the outer periphery 74 of an apertured spring diaphragm 76. The spring diaphragm 76, also called pressure diaphragm, includes a downwardly concave dished center 78 with a central opening 80 therethrough formed by an upwardly curved edge portion or flange 82 therearound.

In the illustrated arrangement, the peripheral edges 62, 74 of the diaphragms 60, 76 are held in place within a large diameter bore 84 on the upper end of the closure 12 by means of a retainer plate 86 having an upwardly curved cover 88 overlying the upper surface of the pressure diaphragm 76 in spaced relationship thereto. Openings 90 are formed in plate cover 88. The cover 88 is connected to a reversely bent annular peripheral wall 92 on the retainer plate 86 that engages the stacked diaphragms and gasket 72. An upstanding flange 94 on peripheral wall 92 has a plurality of slotted tabs 96 formed therein that are upset to interlockingly engage the walls of the bore 84 so as to securely fasten the diaphragms 60, 76 with respect to the closure 12.

The partition wall 32 includes a pair of spaced apart semi-circular baffle ridges 98, 100. The baffle 98 is interposed between a pair of vacuum relief ports 102, 104 formed through the flange 52 and the ridge 64 to communicate an atmospheric space 106 between closure 12 and filler neck 16 with an annular groove 108 formed in the upper surface of the partition wall 32 radially inwardly of the ridge 64. Like relief ports 110, 112 are formed in the shell opposite to ports 102, 104 to perform the same function. The ports are all formed on chord lines of a circle formed by the outer periphery of flange 52 and thus direct flow away from the center of wall 32. This directional control along with baffle ridges 98, 100 prevent dust and dirt impingement on the seal surface of a truncated conical valve seal 114 which is mounted on top of a pedestal 115 formed centrally with the partition wall 32.

The baffle 98 separates the vacuum relief ports 102, 104 from an annular depression 116 that has a radially inwardly, upwardly sloped wall portion 118 thereon that forms an annular opening 120 about the base of pedestal 115 and baffle 100 likewise separates ports 110, 112 from depression 116.

The valve seal 114 is retained on pedestal 115 by a cylindrical vacuum valve seal retainer element 126 which is press fitted in a vertical central bore 127 through the wall 32. The retainer element 126 includes a downwardly, radially outwardly flared skirt 128 at the upper end thereof which overlies a central annular portion of the seal 114 to clamp the seal to the pedestal.

As shown in FIG. 1, when the system is sealed and has a pressure therein within predetermined high and low limits, the upwardly curved edge 70 on the pressure diaphragm 60 is located against the upper surface 113 of the conical seal 114 and thus forms a sealing perimeter of small diameter so as to maintain a desired unit sealing pressure for sealing communication between the annular depression 116 and the interior bore 30 of the skirt 22 through the passage 136 through the retainer element 126.

In addition to the vacuum relief valve action between the vacuum diaphragm 60 and the vacuum seal 114, the valve assembly 58 has a high pressure relief capability provided by the pressure diaphragm 76 and a pressure relief valve seal element 138.

The pressure relief valve seal element 138 has a spherical apex portion 140 thereon fit through a reduced diameter central opening 142 in the retainer plate 86 as will be described in more detail later. Beneath the plate 86, the element 138 has a conically shaped, outwardly flared skirt 146 formed as a truncated cone, 45° to the vertical axis of this element.

Under normal pressure conditions, the upper surface of the conically shaped skirt 146 is engaged by the upwardly turned edge 82 of the apertured pressure spring diaphragm 76.

The turned edge 82 of pressure diaghragm 76 and turned edge 70 of vacuum diaphragm 60 will wipe against the upper surface of the skirt seal 146 and skirt seal 114, respectively, to produce a positive seal surface therebetween of reduced diameter to maintain a high unit sealing pressure. Furthermore, the conical configuration of the skirts 114, 146 will maintain a constant sealing diameter even though the length of the skirt grows under operating conditions.

By virtue of the aforedescribed arrangement, the vacuum seal 114 and pressure seal 146 will cooperate with the spring diaphragms 60 and 76 to define a normally closed pressure control chamber 148 therebetween that is in direct communication with the interior of the semi-closed fuel system via the passage 136.

In one working embodiment the primary component parts of assembly 10 had the following mechanical and physical characteristics and specifications.

| Component | Specification |
| --- | --- |
| Closure 12 | Delrin 500 - aceytal resin |
| | Valox 310 - polyester resin |
| Thread 24 | 1.790" O.D. |
| | 1.570" root diameter |
| Cover 42 | Zinc plated steel |
| | Thickness .025" |
| Cover wall 46 | 2.65" I.D. |
| Vacuum diaphragm 60 | Anodized aluminum .006" thick; 1.750" O.D. |
| Spring dish 66 | 1.250" O.D. |
| Pressure diaphragm 76 | Anodized Aluminum .006" thick 1.786" O.D. |
| Spring dish 78 | 1.250" O.D. |
| Retainer 86 | Zinc plated steel .010" thick |
| Pressure seal element 138 | Fluorocarbon elastomer Shore "A" 60–70 hardness |
| Vacuum seal element 114 | Fluorocarbon elastomer Shore "A" 60–70 hardness |

Figure 3:
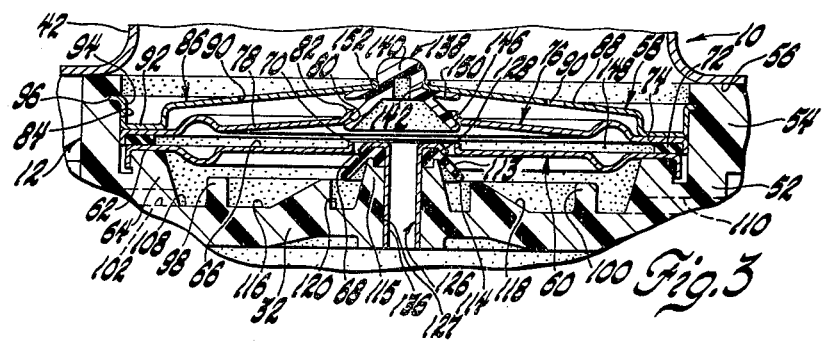
FIG. 3 is a view of a portion of FIG. 1 but with the vacuum diaphragm shown in an open position.

In one working embodiment the vacuum relief mode of operation occurs when a minus 15 to minus 25 inches of $H_2O$ exists in the semi-closed system defined in part by the filler neck 16. This reduced pressure directed into the control chamber 148 through the passage 136 causes the flange 82 of pressure diaphragm 76 to remain closed against pressure seal 146. Atmospheric pressure through bleed ports 102, 104, 110, 112 on the underside of the vacuum diaphragm 60 causes it to quickly snap into an open position as shown in FIG. 3 thereby to present a large flow area annulus between the upwardly turned edge 70 of the diaphragm 60 and the conical surface of seal 114 so that atmospheric pressure quickly passes from the underside of the diaphragm 60 into the control chamber 148 thence through the passage 136 to relieve the vacuum condition in the tank.

Figure 4:
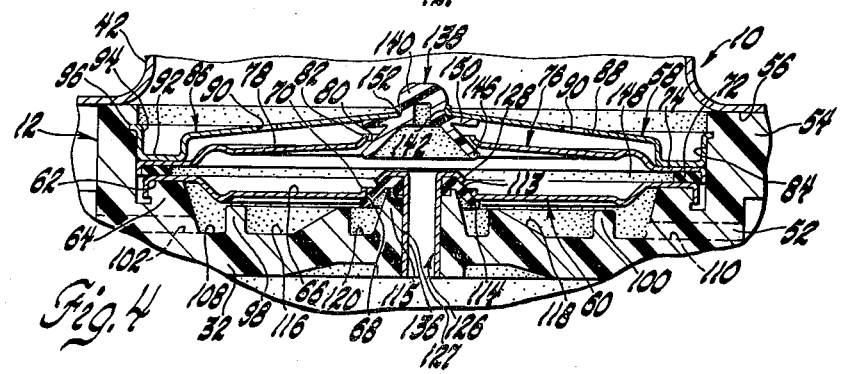
FIG. 4 is a view of a portion of FIG. 1 but with the pressure diaphragm shown in an open position.
Figure 5:
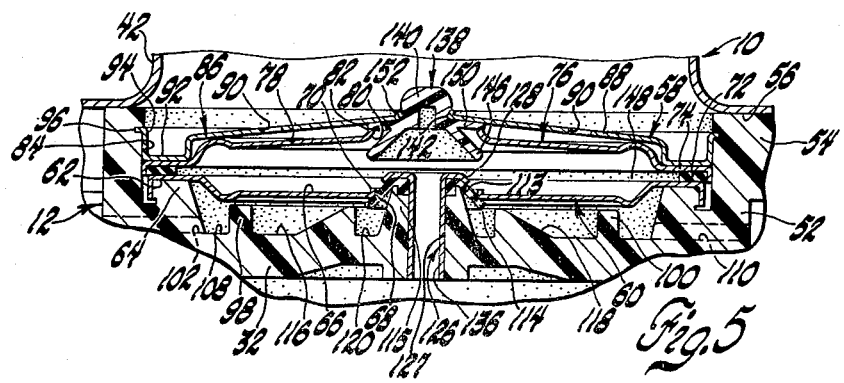
FIG. 5 is a view of a portion of FIG. 1 but with the pressure diaphragm shown in an abnormal surge position.

The normal pressure relief mode of operation occurs when the tank pressure exceeds plus 25 to plus 35 inches of $H_2O$. Under these conditions, the pressure in the control chamber 148 causes the diaphragm 60 to be biased downwardly into closed relationship with the vacuum seal 114. However, the pressure within the control chamber 148 causes the pressure diaphragm 76 to snap upwardly against atmospheric pressure on the upper surface thereof as shown in FIG. 4 to quickly present a large flow area between the upwardly turned flange 82 and the conical surface of seal 146 whereby the excessive pressure within the system dissipates through passage 136 and control chamber 148 and thence through the annular flow area of the pressure valve arrangement 80, 146 and through the relief holes 90 in the retainer plate 86 from whence the flow is passed through the dome space between the cover 42 and the flange 52 to atmosphere.

By virtue of the configuration of the diaphragms 60, 76 the pressure vacuum valve 58 will quickly relieve both vacuum and pressure and will provide a large flow area for quick dissipation of pressure in either mode. Furthermore, the configuration of the diaphragm and seal elements thus far described maintain the system positively sealed so long as the pressure therein is within the vacuum and pressure relief limits set forth above, which are representatively set forth values especially suited for fuel supply systems, other values applying to other applications.

The perimeter of the seal contact between diaphragm and seal elements is such that a high unit pressure seal is maintained when the semi-closed system is sealed. Furthermore, the 45° conical surface configuration of the seal elements will compensate for growth therealong thereby maintaining a relatively constant seal diameter between diaphragm and seal element. There is a rubbing action between the upwardly turned ends of the diaphragm and the seal to produce a self-cleaning action between the sealing components and the assembly. As illustrated in order to provide for the self-compensation of growth, the seal elements must be supported at their apex as for example at the spherical head 140 of the pressure seal element 138 and at the apex of the vacuum sealing element 114.

Figure 6:
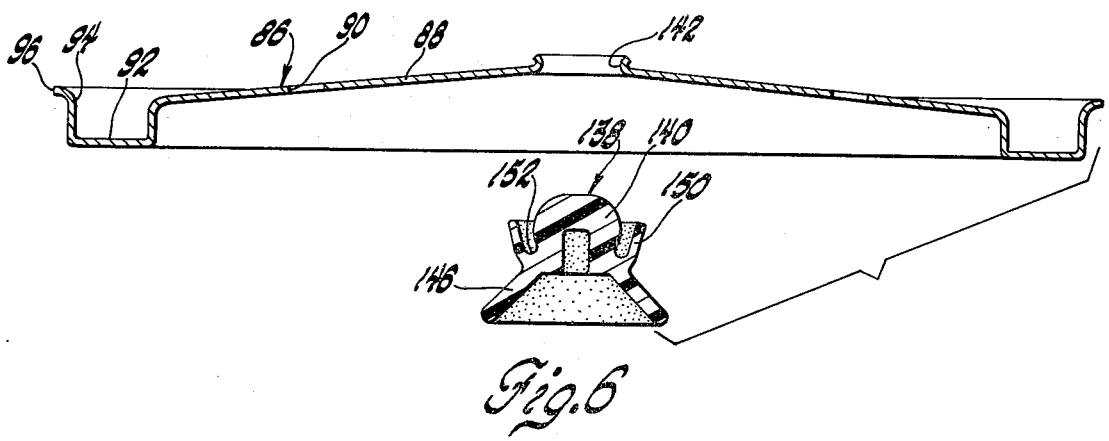
FIG. 6 is an enlarged exploded view of the pressure seal element and retainer plate of FIG. 1.

According to the present invention, the pressure and vacuum relief valve assembly thus far described can be prevented from opening the container to atmosphere in the event of an abnormal pressure surge by the simple addition of a second outwardly flared skirt seal or annular seal surface 150 to the existing seal element 138 and above the annular seal surface provided by the pressure relief skirt seal 146. As shown in FIG. 6, the seal element 138 is formed in a preassembled or relaxed state with the skirt seal 150 upwardly and slightly outwardly flared and with a slight annular depression 152 at the upper juncture with the main body of the element. Then on assembly of the seal element 138 to the retainer plate 86, the retainer plate flange 144 is accepted by the joint 152 while the lower side of the retainer plate about the flange spreads the skirt seal 150 radially outward in a reversed slightly flared direction and so that it overlies the upwardly curved valve flange 82 of the pressure diaphragm 76. Referring then back to FIG. 4 which shows the pressure diaphragm in an open position lifted off the lower skirt seal 146, the added skirt seal 150 is clear of the operation the pressure diaphragm 76 during normal super atmospheric pressure relief. However, should container pressure substantially exceed those pressures normally experienced, which as previously mentioned may tend to exceed plus 25 to plus 35 inches of H₂O in the particular example application disclosed, the added conical seat 150 then functions to seal any opening between the pressure chamber 148 and atmosphere and thereby prevent any escape of liquid from the container through the cap assembly.

For example, with the cap assembly arrangement shown having the specifications described above and without benefit of restraint of the pressure diaphragm by the additional seal 150 it has been found that in an abnormal event such as where there occurs inversion of the container there may occur pressure surges in excess of 20 psi. and as high as 60 psi. and that such pressures can deform the pressure diaphragm in a wide open position thereby permitting liquid escape. According to the present invention the conical valve seat 150 is spaced relative to the conical valve seat 146 and with regard to the normal deflection range of the pressure diaphragm so that in such abnormal circumstances the pressure diaphragm will deflect sufficiently in response to a pressure surge beyond the normal pressure relief range and within the diaphragm's elastic limit to then bottom out on the conical valve seat 150 to seal off the pressure chamber 148 and thus prevent leakage or escape of any liquid through the cap but in the normal pressure relief range below that abnormal pressure surge condition the pressure diaphragm remains free to operate in cooperation with the other conical valve seat 146 to provide the normal pressure relief operation.

While the embodiment of the present invention, as herein disclosed, constitutes a preferred form, it is to be understood that other forms might be adopted.

I claim:

1. A pressure and vacuum relief valve assembly for a liquid container comprising means including a vacuum diaphragm and a wall cooperatively providing a vacuum relief chamber, a vent passage communicating said vacuum relief chamber with atmosphere, means including a pressure diaphragm exposed on an atmospheric side to atmosphere and cooperating on an opposite pressure side with said vacuum diaphragm to provide a control chamber, said diaphragms each having an aperture therein, a pressure vent passage for communicating said control chamber with the interior of a container through the aperture in said vacuum diaphragm, said vacuum diaphragm normally sealingly engaging about the aperture therein with said wall and operable to disengage therefrom to provide for communication between said vacuum relief chamber and the interior of the container only upon a predetermined reduction in pressure in the container below atmospheric pressure, means including a valve seal element extending through the aperture of said pressure diaphragm, said valve seal element having first and second valve seal means on the respective pressure and atmospheric sides of said pressure diaphragm, said pressure diaphragm normally sealingly engaging about the aperture therein with said first valve seal means and operable to disengage therefrom to provide for communication between atmosphere and said control chamber only upon a pressure increase in the container to a predetermined value above atmospheric pressure, and said second valve seal means arranged relative to said first valve seal means so as to be sealingly engaged by second pressure diaphragm about the aperture therein to prevent any communication between said control chamber and atmosphere upon the occurrence of a pressure surge in said control chamber exceeding said predetermined value above atmospheric pressure whereby leakage from the container through said aperture in said pressure diaphragm is positively prevented.

2. A pressure and vacuum relief valve assembly for a liquid container comprising means including a vacuum diaphragm and a wall cooperatively providing a vacuum relief chamber, a vent passage communicating said vacuum relief chamber with atmosphere, means including a pressure diaphragm exposed on an atmospheric side to atmosphere and cooperating on an opposite pressure side with said vacuum diaphragm to provide a control chamber, said diaphragms each having a centrally located circular aperture therein, a pressure vent passage for communicating said control chamber with the interior of a container through the aperture in said vacuum diaphragm, said vacuum diaphragm normally sealingly engaging about the aperture therein with said wall and operable to disengage therefrom to provide for communication between said vacuum relief chamber and the interior of the container only upon a predetermined reduction in pressure in the container below atmospheric pressure, a one-piece valve seal element extending through the aperture of said pressure diaphragm, said valve seal element having first and second annular valve seal surfaces on the respective pressure and atmospheric sides of said pressure disphragm, said pressure diaphragm normally sealingly engaging about the aperture therein with said first annular valve seal surface and operable to disengage theefrom to provide for communication between atmosphere and said control chamber only upon a pressure increase in the container to a predetermined value above atmospheric pressure, and said second annular valve seal surface axially spaced relative to said first valve seal surface so as to be sealingly engaged by second pressure diaphragm about the aperture therein to prevent any communication between said control chamber and atmosphere upon the occurrence of a pressure surge in said control chamber exceeding said predetermined value above atmospheric pressure whereby leakage from the container through said aperture in said pressure diaphragm is positively prevented.

* * * * *